3,056,790
8-RO-2-QUINOLINE ACRYLIC ACID AND LOWER ALKYL ESTERS THEREOF

Joseph G. Cannon, Madison, Wis., assignor to Wisconsin Alumni Research Foundation, Madison, Wis., a corporation of Wisconsin
No Drawing. Filed Jan. 8, 1960, Ser. No. 1,163
3 Claims. (Cl. 260—287)

The present invention relates generally to derivatives of 8-hydroxy quinaldine and more specifically to 8-RO-2-quinoline acrylic acid and lower alkyl esters of the same, where R is selected from the group consisting of hydrogen and lower alkyl groups. The compounds are prepared by condensing 8-hydroxyquinaldine or 8-lower alkoxyquinaldine with chloral, and the reaction of the resulting $\gamma,\gamma,\gamma$-trichloro-$\alpha$(8-hydroxy- or lower alkoxy-2-quinolyl)-$\beta$-hydroxypropane with alcoholic potassium hydroxide which upon neutralization yields the desired 8-RO-2-quinoline acrylic acid.

The following examples will serve to illustrate the invention.

EXAMPLE I

*Ethers of 8-Hydroxyquinaldine*

Eleven grams (0.069 mole) of 8-hydroxyquinaldine was dissolved in 50 ml. of absolute ethanol in a 250 ml. standard-taper round-bottom flask equipped with a reflux condenser and a calcium chloride tube. To this solution was added 4 gm. (0.1 mole) of sodium hydroxide dissolved in 4 ml. of distilled water. To the resulting mass 0.1 mole of ethyl chloride was added, and the mixture was refluxed on a steam bath for five hours. The alcohol was then evaporated on a steam bath at atmospheric pressure. The gummy residue was dissolved in about 200 ml. of water and this solution was extracted several times with ether. The combined ethereal extracts were washed with a 100 ml. portion of 2.5% sodium hydroxide solution, and then with water. The ether extract was dried over anhydrous sodium sulfate, the ether was removed on a steam bath, and the oily residue was distilled under reduced pressure or crystallized. The ethyl ether has a melting point of 52–53° C. In a similar manner the methyl and propyl ethers can be readily prepared by use of the appropriate alkyl (methyl or propyl) halide.

EXAMPLE II

*Condensation of 8-Hydroxyquinaldine and Its Ethers and Chloral*

To 0.1 mole of 8-hydroxyquinaldine or its ether contained in a 100 ml. standard-taper round-bottom flask equipped with a reflux condenser and a calcium chloride tube was added 15 ml. of pyridine (dried over potassium hydroxide pellets) and 0.1 mole of chloral, and the mixture was heated on a steam bath for two hours. The resulting tarry reaction mixture was poured into about 250 ml. of ether, the ethereal solution was filtered, and the ether was removed on a steam bath. An excess of 1:6 hydrochloric acid was added to the residue and the resulting solution was heated to boiling. It was then filtered to remove tars, and the filtrate was cooled. On neutralizing the filtrate with solid sodium carbonate, $\gamma,\gamma,\gamma$-trichloro-$\alpha$-(8-hydroxy- or alkoxy-2-quinolyl)-$\beta$-hydroxypropane precipitated from solution and was recrystallized from ethanol. The 8-hydroxy trichloro hydroxypropane derivative melts at 113–114° C., and the corresponding methyl, ethyl and propyl ethers (8-alkoxy derivatives) melt, respectively, at 127–128° C., 146–147° C., and 100–101° C.

EXAMPLE III

*8-Hydroxy-2-Quinoline Acrylic Acid*

Twenty-five hundredths of a mole of potassium hydroxide was dissolved in 70 ml. of absolute ethanol in a 500 ml. standard-taper round-bottom flask equipped with a reflux condenser and a calcium chloride tube. To this, 0.05 mole of $\gamma,\gamma,\gamma$-trichloro-$\alpha$-(8-hydroxy-2-quinolyl)-$\beta$-hydroxypropane dissolved in 50 ml. of absolute ethanol was added. The mixture was heated very cautiously on a water bath until the violent reaction subsided, then it was refluxed on a steam bath for five hours. The alcohol was evaporated on a steam bath at atmospheric pressure and the residue was extracted with a convenient amount of water. This aqueous extract was filtered to remove the undissolved tarry matter, and the clear filtrate was made faintly acidic to Congo red paper by the addition of glacial acetic acid. The precipitated heterocyclic acid was collected on a filter and was recrystallized from ethanol. It had a melting point of 205–206° C. with decomposition.

EXAMPLE IV

*8-Alkoxy-2-Quinoline Acrylic Acids*

A procedure similar to the one used for 8-hydroxy-2-quinoline acrylic acid is employed, except that 0.2 mole of potassium hydroxide was used to convert the 8-lower alkoxy trichloro hydroxypropane intermediates to the corresponding acrylic acids. The methoxy, ethoxy and propoxy derivatives have, respectively melting points of 197–198° C. with decomposition, 214–216° C. with decomposition, and 181–182° C.

EXAMPLE V

*Ethyl Esters of Acids*

Five thousandths mole of acrylic acid product was dissolved in 25 ml. of absolute ethanol in a 250 ml. standard-taper round-bottom flask equipped with a reflux condenser and a calcium chloride tube, and the solution was saturated with dry hydrogen chloride gas. It was then refluxed on a water bath for two hours. The solution was evaporated to dryness on a steam bath, and the gummy residue was dissolved in a convenient amount of water. This aqueous solution was neutralized with solid sodium bicarbonate, and it was extracted with ether. The ether was removed from the extract on a steam bath, and the oily residue was crystallized from a hydrocarbon solvent (Skelly B). The ethyl ester of the 8-hydroxy derivative had a M.P. of 85–86° C., and the ethyl esters of the corresponding methyl, ethyl and propyl ethers had, respectively, melting points of 51–52° C., 104–105° C., and 81–82° C. In a similar manner to that described above the methyl and propyl esters of the acrylic acid derivatives can be readily prepared by replacing the absolute ethanol used in Example V with anhydrous methanol or propanol.

In a manner similar to that described in Example I the corresponding alkylaminoalkyl derivatives can be prepared by the use of an alkylaminoalkyl chloride in place of ethyl chloride. Using diethylaminoethyl chloride and subjecting the resulting ether to the reactions described in Examples II and IV, the 8-diethylaminoethoxy-2-quinoline acrylic acid is obtained with a melting point of 198–200° C. with decomposition.

The products of the present invention are characterized by antifungal activity against dermatophytes such as *T. mentagrophytes* and *E. floccosum*. They can be incorporated into conventional inert pharmaceutical carriers including ointments and powders in concentrations of about 0.5–5.0% by weight, in accordance with standard practices in the art, and can be used in this form to inhibit the growth of dermatophytes such as noted above in the treatment of athletes foot (tinia pedis) and like type infections.

I claim:
1. A compound selected from the group consisting of 8-RO-2-quinoline acrylic acid and lower alkyl esters of the same, where R is selected from the group consisting of hydrogen and lower alkyl.
2. 8-hydroxy-2-quinoline acrylic acid.
3. Ethyl (8-hydroxy-2-quinoline) acrylate.

References Cited in the file of this patent

Chemical Abstracts, page 3197, vol. 21 (1927).
Chakravarti: J. Sc. Ind. Research (India), 9B, 305–6 (1950).
Matsumura et al.: J. American Chem. Soc., vol. 77, pages 6671–4 (1955).
Vaidya et al.: J. Am. Pharm. Assoc., vol. 48, pages 10–13, January (1959).